United States Patent
Hjerpe et al.

(10) Patent No.: US 11,344,126 B2
(45) Date of Patent: May 31, 2022

(54) INFLATABLE STRUCTURE

(71) Applicant: Volvo Car Corporation, Gothenburg (SE)

(72) Inventors: Erik Hjerpe, Torslanda (SE); Nathan Nuzzo, Stockholm (SE)

(73) Assignee: Volvo Car Corporation, Gothenburg (SE)

( * ) Notice: Subject to any disclaimer, the term of this patent is extended or adjusted under 35 U.S.C. 154(b) by 105 days.

(21) Appl. No.: 16/903,442

(22) Filed: Jun. 17, 2020

(65) Prior Publication Data

US 2020/0397145 A1     Dec. 24, 2020

(30) Foreign Application Priority Data

Jun. 20, 2019 (EP) .................................... 19181444

(51) Int. Cl.
| | | |
|---|---|---|
| A47C 4/54 | (2006.01) | |
| B32B 1/00 | (2006.01) | |
| B32B 5/26 | (2006.01) | |
| B60N 2/28 | (2006.01) | |
| B60N 2/30 | (2006.01) | |
| B63B 32/51 | (2020.01) | |
| A47C 5/12 | (2006.01) | |

(52) U.S. Cl.
CPC .................. *A47C 4/54* (2013.01); *B32B 1/00* (2013.01); *B32B 5/26* (2013.01); *B60N 2/2881* (2013.01); *B60N 2/30* (2013.01); *B63B 32/51* (2020.02); *A47C 5/12* (2013.01); *B32B 2255/02* (2013.01); *B32B 2255/26* (2013.01); *B32B 2262/0276* (2013.01)

(58) Field of Classification Search
None
See application file for complete search history.

(56) References Cited

U.S. PATENT DOCUMENTS

| | | | |
|---|---|---|---|
| 2014/0251195 A1 | 9/2014 | Excoffon | |
| 2017/0158288 A1* | 6/2017 | McCleod-Ross | ....... B63B 7/085 |
| 2019/0263475 A1* | 8/2019 | Cooper | ................... B63B 32/40 |
| 2019/0263476 A1* | 8/2019 | Haller | ....................... B63B 3/26 |
| 2020/0146912 A1* | 5/2020 | Gillespie | .............. A61G 7/1025 |
| 2020/0307118 A1* | 10/2020 | Hjerpe | .................... B29C 65/62 |
| 2021/0323494 A1* | 10/2021 | Terbu | .................... B60R 21/207 |

FOREIGN PATENT DOCUMENTS

WO     20180170337 A2     9/2018

OTHER PUBLICATIONS

Jan. 10, 2020 European Search Report issued on International Application No. 19181444.

* cited by examiner

*Primary Examiner* — David E Allred
(74) *Attorney, Agent, or Firm* — Clements Bernard Walker; Christopher L. Bernard

(57) ABSTRACT

The present disclosure relates to an inflatable structure transformable between a deflated state and an inflated state, the inflatable structure comprising a drop stitch fabric having a first layer and a second layer tethered by drop stitches. At least one layer of the first and second layers comprises a ridge formed by a folded portion of the one layer, secured by a fixation line. The disclosure also relates to a manufacturing method of an inflatable structure in accordance with the foregoing, and an inflatable seat comprising such an inflatable structure.

11 Claims, 4 Drawing Sheets

INFLATABLE STRUCTURE

CROSS-REFERENCE TO RELATED APPLICATION

The present disclosure claims the benefit of priority of co-pending European Patent Application No. 19181444.1, filed on Jun. 20, 2019, and entitled "INFLATABLE STRUCTURE," the contents of which are incorporated in full by reference herein.

TECHNICAL FIELD

The present disclosure relates to an inflatable structure and a method for manufacturing thereof.

BACKGROUND

Products based on inflatable drop stitch technology are becoming increasingly popular, not the least since such products—e.g. boards, kayaks, floats, gym mats etc.—when deflated, may be less bulky and hence more easily stored and/or transported, and further, be less heavy and/or less costly, than corresponding products of traditional material. Commonly, an inflatable drop stitch may be e.g. a PVC-coated, TPU-coated and/or laminated nylon and/or polyester fabric with layers joined by a dense array of e.g. vertical linear and/or zigzag fibers and/or polyester strands that are uniform in size. When the inflatable drop stitch then is adapted—e.g. glued and/or welded—into desired shape, and subsequently pressurized with air and/or gas which may bias the layers in tension, it may be transformed into a strong, firm structure. The vertical fibers and/or strands—which may be referred to as the drop stitches which is a term used herein—hold the air chamber firmly in shape, thus allowing the inflated structure to maintain its shape and stability under heavy outside pressure and impact.

Inflatable drop stitch products may, however, owning to the fact that the layers joined by the drop stitches need to be sufficiently flexible for allowing said products to be e.g. folded, rolled and/or wrapped up when deflated for e.g. transport and/or storage, be weak in buckling. This negative effect may arise when one of the layers in the inflated state of the inflatable drop stitch product is affected by a buckling and/or bending load—such as e.g. applied from a human—and no longer is in tension, subsequently buckling. It is thus known to attempt to stiffen inflatable drop stitch products by adding e.g. batons and/or by adding e.g. flexible elements, such as e.g. fiber reinforced polymer sheets, at selected sections of one or both layers of said products. Such attempts, however, may cause complexity and further come at a high production cost.

SUMMARY

It is therefore an object of embodiments herein to provide an approach that overcomes or ameliorates at least one of the disadvantages of the prior art, or to provide a useful alternative.

The object above may be achieved by the subject matter disclosed herein. Embodiments are set forth in the appended dependent claims, in the following description and in the drawings.

The disclosed subject matter relates to an inflatable structure transformable between a deflated state and an inflated state, which inflatable structure comprises a drop stitch fabric having a first layer and a second layer tethered by drop stitches. The at least one layer of the first and second layers comprises a ridge formed by a folded portion of the one layer, secured by a fixation line.

The disclosed subject matter further relates to a method for manufacturing an inflatable structure transformable between a deflated state and an inflated state, which inflatable structure comprises a drop stitch fabric having a first layer and a second layer tethered by drop stitches. The manufacturing method forms for at least one layer of the one and second layers, a ridge, from a folded portion of the one layer. Said method further secures the ridge with a fixation line.

Moreover, the disclosed subject matter relates to an inflatable seat—e.g. vehicle seat and/or child seat—comprising the inflatable structure described herein.

Thereby, there is introduced an approach according to which there is provided reinforcement of the inflatable structure and/or tailoring of a shape of the inflatable structure in an inflated state thereof.

That is, since the inflatable structure—which is inflatable between a deflated state and an inflated state—comprises a drop stitch fabric having a first layer and a second layer tethered by drop stitches, the inflatable structure has the potential to in an inflated state be transformed into a strong, firm structure. That is to say, the drop stitches may in the inflated state hold the inflatable structure firmly in shape, thus allowing the inflatable structure to maintain its shape and stability under heavy outside pressure and impact.

Moreover, that is, since at least one layer of the first and second layers comprises a ridge formed by a folded portion of the one layer, secured by a fixation line, characteristics of the inflatable structure are affected. That is to say, the ridge affects the behaviour of the inflatable structure in that said ridge—in the inflated state—may provide reinforcement of the inflatable structure at—and/or in vicinity of—the ridge, and/or affect the shape of the inflatable structure as a result of that the inflatable structure may purposely be made to slightly bend around, curve and/or arch at—or along—said ridge.

That is, in the inflated state, the inflatable structure is pressurized, which biases the first and second layer in tension. Upon the potential application of a load—e.g. from a human applying weight—to an area of the one layer comprising the ridge, the ridge may act as a reinforcement of the inflatable structure at—or in vicinity of—said ridge contributing to preventing the one layer from not being in tension, thus subsequently contributing to preventing the inflatable structure from buckling, a situation which potentially may have occurred should said ridge not have been provided.

Moreover, that is, since the ridge is formed by a folded portion of the one layer, said one layer comprising the ridge may have a smaller surface area as compared to a surface area of a layer not comprising said ridge. With a deviation in size of surface area between layers, an inflatable structure may tend to in the inflated state assume an altered shape, such as a slightly curved shape, as compared to should said layers have had essentially equally sized surface areas. Thus, with the introduction of the ridge and subsequently the deviation in size of surface area resulting therefrom, the inflatable structure may assume an altered shape as affected by said ridge, in that the inflatable structure tends to slightly bend around, curve and/or arch at—or along—said ridge.

Accordingly, with the approach provided by the inventive concept, an inflatable structure may in an improved manner withstand buckling loads and/or assume a tailored shape in the inflated state, without a need for additional stiffeningand/or shape-providing elements, while remaining sufficiently flexible to be e.g. folded, rolled and/or wrapped up in the deflated state.

The technical features and corresponding advantages will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DESCRIPTION OF EMBODIMENTS

Figure 1:
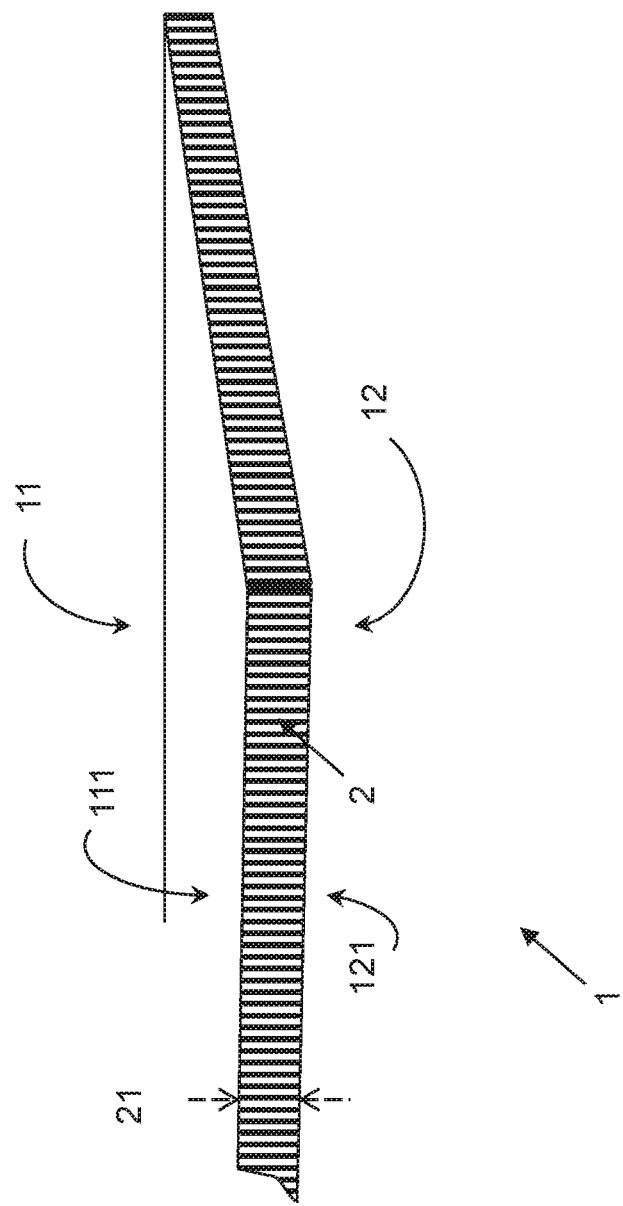
FIG. 1 illustrates a schematic three-dimensional side view of a portion of an exemplifying drop stitch fabric.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to an inflatable structure transformable at least between a deflated state and an inflated state, there will be disclosed an approach according to which there is provided reinforcement of the inflatable structure in the inflated state and/or tailoring of a shape of the inflatable structure in said inflated state.

Referring now to the figures and FIG. 1 in particular, there is depicted a schematic three-dimensional side view of a portion of an exemplifying drop stitch fabric 1. The drop stitch fabric 1 has a first layer 11 and a second layer 12 tethered by drop stitches 2. The first and second layers have a respective surface area 111, 121. The drop stitch fabric 1 may refer to any drop stitch fabric commonly known in the art, and be of any dimensions—e.g. width and/or length—deemed suitable, e.g. range from tenths of metres up to tens of metres. In a similar manner, the first layer 11 and the second layer 12 may refer to any drop stitch layers commonly known, and be of any thickness deemed suitable e.g. in view of an intended inflatable structure, e.g. range from tenths of millimetres up to several millimetres, and/or comprise any material commonly known, such as for instance nylon and/or polyester. Moreover, the first layer 11 and/or the second layer 12 may each be represented by a respective set of layers lying on top of another in a known manner, which layers may or may not comprise different materials. Yet again, in a similar manner, the drop stitches 2 may be represented by any drop stitches known in the art, e.g. be represented by fibers, strands and/or threads e.g. comprising polyester material and moreover e.g. be provided in a linear, zigzag and/or random pattern. The drop stitches 2 may further be of any dimensions and/or characteristics deemed suitable, e.g. in view of an intended inflatable structure, and for instance may a length of the drop stitches 2, i.e. a drop stitch length 21, range from a few millimetres up to hundreds of millimetres. The drop stitches 2 may in a commonly known manner extend through the first layer 11 and the second layer 12, and further—should the first 11 and/or the second 12 layer be represented by a respective set of layers—then the drop stitches 2 may extend through one, a few or all of the layers in the respective set. The drop stitch fabric 1, the first layer 11, the second layer 12 and the drop stitches 2 may be—and/or have been—manufactured in any commonly known manner, for instance with support from a—potentially known—drop stitching system and/or machine (not shown), e.g. a weaving, sewing, stitching and/or loom machine and/or system.

The expression "drop stitch fabric" may refer to "uniform, integral and/or undivided drop stitch fabric", "drop stitch fabric with a uniform extension area" and/or "two-layer fabric", whereas "fabric" may refer to "material" and/or "cloth". The expression "layer", on the other hand, may refer to "set of parallel layers and/or "essentially and/or at least partly parallel layers", whereas "tethered" by drop stitches may refer to "tethered by a dense array" of drop stitches and further to "coupled", "joined" and/or "held" by drop stitches. "Drop stitches" may refer to "drop stitch tethers", "spacer threads" and/or "vertical stitches", and further to "drop stitches there between".

FIG. 2a illustrates a schematic three-dimensional side view of an exemplifying inflatable structure 10 according to embodiments of the disclosure. The inflatable structure 10 may be represented by any inflatable product and/or article deemed feasible and/or applicable, for instance an inflatable board, kayak, float, gym mat and/or trampoline etc., and further for instance an inflatable seat, child seat and/or pet cage or the like which e.g. may be carried on-board a vehicle and/or be detachably attached to an interior thereof.

The inflatable structure 10, which is inflatable at least between a deflated state and an inflated state, comprises a drop stitch fabric 1, e.g. a drop stitch fabric 1 as shown in exemplifying FIG. 1, having a first layer 11 and a second layer 12 tethered by drop stitches 2. Thereby, the inflatable structure 10 has the potential to in an inflated state be transformed into a strong, firm structure. That is to say, the drop stitches 2 may in the inflated state hold the inflatable structure 10 firmly in shape, thus allowing the inflatable structure to maintain its shape and stability under heavy outside pressure and impact.

The deflated state may refer to a condition of the inflatable structure 10 in which the inflatable structure is not pressurized, and may for instance be desirable for storage and/or transportation of the inflatable structure 10. Correspondingly, the inflated state may refer to a condition of the inflatable structure 10 in which the inflatable structure 10 is pressurized—e.g. at least up to a predetermined value, pressure and/or percentage of e.g. a maximum potential pressure to which the inflatable structure 10 may be inflated—and which state further may be referred to as a state for intended use of the inflatable structure 10.

The expression "inflatable structure transformable" between a deflated and an inflated state, may refer to "inflatable structure adapted to transition and/or change" between a deflated and an inflated state. "Deflated" state, on the other hand, may refer to "unpressurized" state and/or "storage and/or transportation" state, whereas "inflated" state may refer to "pressurized" state and/or "usage and/or intended use" state. The expression "state" may refer to "condition" and/or "mode". The expression "inflatable" may refer to "pressurizable", whereas "structure" may refer to "arrangement", "article", "product" and/or "body".

Figure 2:
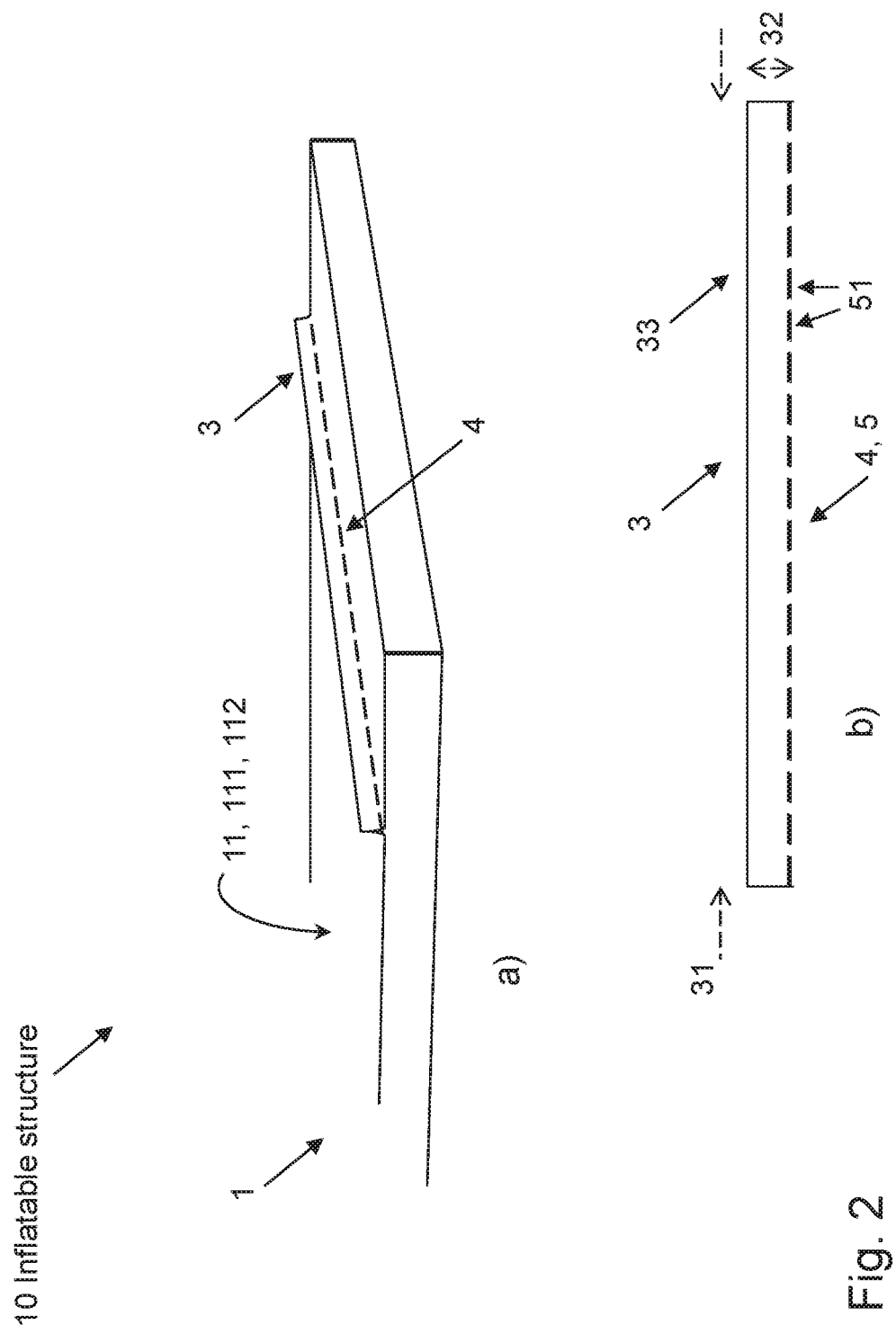
FIG. 2 illustrates schematic views of an exemplifying inflatable structure according to embodiments of the disclosure.

At least one layer 112 of the first and second layers 11, 12—in exemplifying FIG. 2 the first layer 11—comprises a ridge 3 formed by a folded portion of the one layer 112, secured by a fixation line 4. Thereby, by providing a ridge 3, i.e. securing a first drop stitches facing portion of at least one layer 112 to a second drop stitches facing portion of said layer 112, characteristics of the inflatable structure 10 are affected. That is to say, the ridge 3 affects the behaviour of the inflatable structure 10 in that said ridge 3—in the inflated state—may provide reinforcement of the inflatable structure 10 at—and/or in vicinity of—the ridge 3, and/or affect the shape of the inflatable structure 10 as a result of that the inflatable structure 10 may purposely be made to slightly bend around, curve and/or arch at—or along—said ridge 3.

That is, in the inflated state, the inflatable structure 10 is pressurized, which biases the first and second layers 11, 12 in tension. Upon the potential application of a load—e.g. from a human applying weight—to an area of the one layer 112 comprising the ridge 3, the ridge 3 may act as a reinforcement of the inflatable structure 10 at—or in vicinity of—said ridge 3 contributing to preventing the one layer 112 from not being in tension, thus subsequently contributing to preventing the inflatable structure 10 from buckling, a situation which potentially may have occurred should said ridge 3 not have been provided.

Moreover, that is, since the ridge 3 is formed by a folded portion of the one layer 112, said one layer 112 comprising the ridge 3 may have a smaller surface area 111 as compared to a surface area 121 of a layer 12 not comprising said ridge 3. With a deviation in size of surface area 111, 121 between layers 11, 12, an inflatable structure 10 may tend to in the inflated state assume an altered shape, such as a slightly curved shape, as compared to should said layers 11, 12 have had essentially equally sized surface areas 111, 121. Thus, with the introduction of the ridge 3 and subsequently the deviation in size of surface area 111, 121 resulting therefrom, the inflatable structure 10 may assume an altered shape as affected by said ridge 3, in that the inflatable structure tends to slightly bend around, curve and/or arch at—or along—said ridge 3.

Accordingly, with the approach provided by the inventive concept, an inflatable structure 10 may in an improved manner withstand buckling loads and/or assume a tailored shape in the inflated state, without a need for additional stiffening- and/or shape-providing elements, while remaining sufficiently flexible to be e.g. folded, rolled and/or wrapped up in the deflated state.

The expression "ridge" may refer to "folding", whereas "formed by" a folded portion may refer to "comprising" a folded portion. "Folded" portion, on the other hand, may refer to "pinched", "draped" and/or "contracted" portion, whereas "portion" may refer to "section" and/or "segment". The expression "secured by" a fixation line may refer to "fixed by" and/or "held together" by a fixation line, whereas "fixation" line may refer to "coupling" line. The phrase "ridge formed by a folded portion of the one layer, secured by a fixation line" may further refer to "ridge formed by a folded portion of the one layer and secured by a fixation line". "Load", on the other hand, may refer to "buckling load" and/or "bending load".

The inflatable structure 10 and/or the drop stitch fabric 1—or portions thereof including the ridge 3 and/or fixation line 4—may be coated and/or sealed. Thereby, the inflatable structure 10 may be made airtight and/or gas proof, i.e. the inflatable structure 10 may—following upon inflation thereof 10—be able to remain in the inflated state without air seeping out. Coating and/or sealing may be, and or have been, provided in any manner—e.g. known in the art—enabling the inflatable structure 10 to be airtight, and for instance be represented by one or more commonly known layers of coating, e.g. PVC, TPU, urethane and/or Hypalon, and/or commonly known patches.

A positioning of the ridge 3 may be selected as deemed suitable for the inflatable structure 10 at hand, and the ridge 3 may thus be positioned anywhere at the surface area 111 of the at least one layer 112. Correspondingly, dimensions of the he ridge 3, such as an extension 31 thereof, a width 32 thereof and/or a shape 33 thereof, which are exemplified in FIG. 2b which illustrates a front view of the exemplifying inflatable structure 10 of FIG. 2a, may be of any proportions deemed suitable for the inflatable structure 10 at hand. For instance, the extension 31 of the ridge 3—as measured along the fixation line 4—may range from a few millimetres up to tens of metres, whereas the width 32 of the ridge 3—as measured in a direction perpendicular to the surface area 111 of the at least one layer 112—for instance may range from less than a millimetre up to hundreds of millimetres, and further may vary along the extension 31 of the ridge 3. In a similar manner, the shape 33 of the ridge 3—in a plane of the surface area 111 of the at least one layer 112—may assume any feasible form, such as one or a combination of e.g. a straight line and a curved line, continuously and/or intermittently arranged. Although the fixation line 4 may have any shape 33 deemed suitable for the inflatable structure 10 at hand, said fixation line 4 may often be straight or slightly curved or bent, whereas sharp corners often may be avoided.

Optionally, one or more further ridges may additionally be provided, comprised in the same layer or the opposite one, with the ridges arranged in relation to one another as deemed suitable for the inflatable structure 10 at hand.

The expression "positioning" of the ridge may refer to "disposition", "distribution" and/or "location" of the ridge, whereas "dimensions" of the ridge may refer to "characteristics" and/or "proportions" of the ridge. "Extension" of the ridge, on the other hand, may refer to "length", "spread" and/or "extent" of the ridge, whereas "extension of the ridge" may refer to "extension of the ridge measured along the fixation line in a plane of the surface area". The expression "width" of the ridge may refer to "height" of the ridge, and further to "width represented by a shortest distance between an edge of the ridge and the fixation line". "Shape" of the ridge may refer to "form", "layout" and/or "design" of the ridge, whereas "in the inflated state" may refer to "in the inflated state, or in the essentially or substantially inflated state".

The fixation line 4 may be provided in any manner deemed suitable, and may further comprise any fixation means deemed suitable for securing the ridge 3. Optionally, however, and as illustrated in FIG. 2, the fixation line 4 may comprise a seam 5 comprising stitches 51. Thereby, the fixation line 4 may be secured in an efficient and/or convenient manner.

The seam 5 may be of any form and/or design deemed suitable for the inflatable structure 10 at hand, and for instance be essentially straight. Correspondingly, the stitches 51 may be represented by any stitches enabling the ridge 3 to be fixated, and may further be of any dimensions feasible. The seam 5 may be provided—and/or have been provided—in any manner deemed suitable for the inflatable structure 10 at hand, e.g. with support from a sewing machine and/or system, and/or potentially by hand. Should the one layer 112 be represented by a set of layers, then the seam 5 may penetrate and/or extend through one, a few or all of the layers in said set. The expression "a seam" may refer to "at least one seam", whereas "stiches" may refer to "coupling stitches". Moreover, "comprises" a seam may refer to "comprises and/or is constituted by" a seam.

Optionally, a positioning of the ridge 3 may be tailored to enable the inflatable structure 10 to, in the inflated state, provide a predeterminable reinforcement and/or assume a predeterminable shape. Thereby, a disposition of the ridge 3 may be selected in a manner rendering and/or supporting a desired reinforcement of the inflatable structure 10—and/or of the at least one layer 112—in the inflated state, and/or rendering and/or supporting a desired geometry of the inflatable structure 10 in said inflated state.

Optionally, dimensions of the ridge 3 may be tailored to enable the inflatable structure 10 to, in the inflated state, provide a predeterminable reinforcement and/or assume a predeterminable shape. Thereby, proportions of the ridge 3 may be selected in a manner rendering and/or supporting a desired reinforcement of the inflatable structure 10—and/or of the at least one layer 112—in the inflated state, and/or rendering and/or supporting a desired geometry of the inflatable structure 10 in the inflated state.

Further optionally, the extension 31 of the ridge 3 may be tailored to enable the inflatable structure 10 to, in the inflated state, provide a predeterminable reinforcement and/or assume a predeterminable shape. Further optionally, additionally or alternatively, the width 32 of the ridge 3 in a direction perpendicular to the surface area 111 of the at least one layer 112, may be tailored to enable the inflatable structure 10 to, in the inflated state, provide a predeterminable reinforcement and/or assume a predeterminable shape. Yet further optionally, additionally or alternatively, the shape 33 of the ridge 3 in a plane of the surface area 111 of the at least one layer 112, may be tailored to enable the inflatable structure 10 to, in the inflated state, provide a predeterminable reinforcement and/or assume a predeterminable shape.

The predeterminable reinforcement may refer to any desirable reinforcement deemed suitable for the inflated inflatable structure 10 at hand, and may for instance be represented by reinforcement of a section and/or area of the inflatable structure 10—and/or the at least one layer 112—deemed to potentially be exposed to a substantial load, such as e.g. a section upon which a human and/or object may e.g. be positioned, stand on, rest against and/or lean against. Correspondingly, the predeterminable shape may refer to any desirable geometry deemed suitable for the inflated inflatable structure 10 at hand, and may for instance be represented by an alteration and/or modification, such as e.g. an introduction of one or more curvatures, of a portion and/or section of the inflatable structure 10 and/or the at least one layer 112.

The expression "positioning" of the ridge may, as indicated in the foregoing, refer to "disposition", "distribution" and/or "location" of the ridge, whereas "dimensions" of the ridge, as similarly indicated in the foregoing, may refer to "characteristics" and/or "proportions" of the ridge. "Is/are tailored to enable", on the other hand, may refer to "is/are adapted to enable", "is/are selected to enable". "is/are formed to enable" and/or "enables", and further to "renders". "Tailored" may refer to "adapted" and/or "selected", and further to "adaptable" and/or "selectable". The expression "enable" may refer to "support", "render" and/or "cause", whereas "provide" a reinforcement may refer to "contribute to" a reinforcement. "Reinforcement", on the other hand, may refer to "stiffening", and further to "reinforcement rendered by the ridge", "reinforcement of the at least one layer" and/or "reinforcement of the at least one layer at—or in vicinity of—the ridge". The expression "assume a shape" may refer to "take on a shape", and further to "assume a shape rendered by the ridge". "Predeterminable" may in this context refer to "predetermined" and/or "desired". The phrase "enable the inflatable structure to, in the inflated state, provide a predeterminable reinforcement and/or assume a predeterminable shape" may refer to "enable the inflatable structure to, in the inflated state, assume a predeterminable shape and/or be provided with a predeterminable reinforcement". According to an example, the phrase "a positioning of the ridge is tailored" to enable may refer to "the ridge is positioned" to enable. According to another example, the phrase "dimensions of the ridge are tailored" to enable may refer to "the ridge is dimensioned" to enable.

Figure 3:
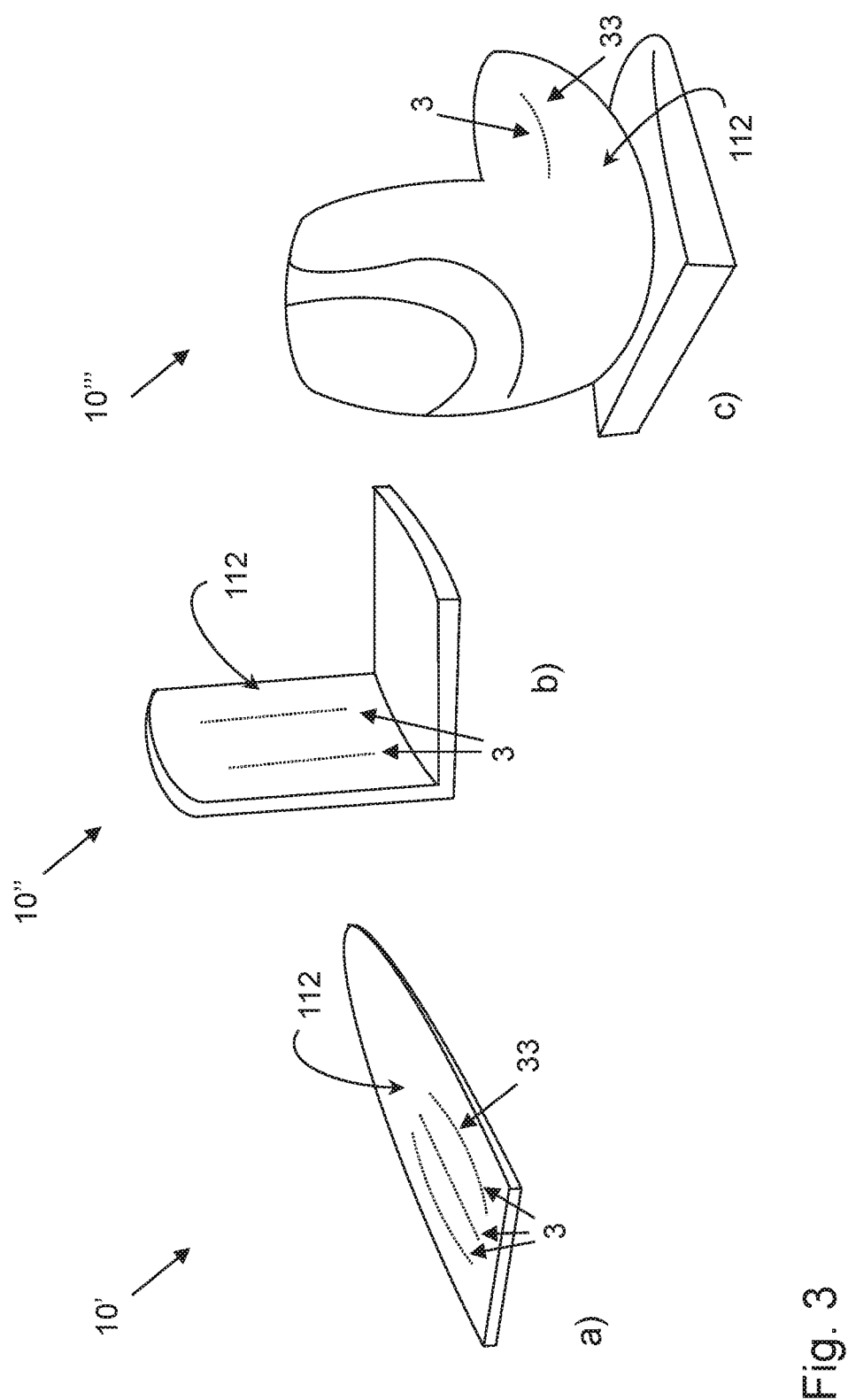
FIG. 3 illustrates schematic views of exemplifying inflatable structures according to embodiments of the disclosure.

FIG. 3a illustrates a schematic view of an exemplifying inflatable structure 10 according to embodiments of the disclosure, represented by an inflatable board 10'. An upper layer 112 of the exemplifying board 10' comprises, e.g. in an area of the board 10' intended for a human to potentially be standing, exemplifying three ridges 3—the outer two having exemplifying slightly curved shapes 33—which respectively or combined may provide the inflatable structure 10, here inflatable board 10', with a reinforcement in an area in vicinity of the ridge(s) 3. Said ridges 3 may, additionally or alternatively, respectively or combined, render the inflatable structure 10, here inflatable board 10', to assume a desired shape and/or geometry, such as for instance a slight curvature of the board 10'.

Moreover, FIG. 3b illustrates a schematic view of an exemplifying inflatable structure 10 according to embodiments of the disclosure, represented by an inflatable seat 10". A forward-facing layer 112 of a backrest of the exemplifying seat 10"—against which a back of a human may be expected to potentially rest and/or lean—comprises, in an area of the backrest e.g. expected to be subjected to substantial load, exemplifying two ridges 3—the two ridges 3 in an exemplifying manner being provided in parallel or essentially in parallel—which may provide the inflatable structure 10, here inflatable seat 10", with a reinforcement in an area in vicinity of the ridge(s) 3. Said ridges 3 may, additionally or alternatively, respectively or combined, render the inflatable structure 10, here inflatable seat 10", to assume a desired shape and/or geometry, such as for instance a slight curvature of the backrest. The exemplifying inflatable seat 10"—which optionally may comprise the inflatable structure 10—may for instance be represented by an inflatable vehicle seat, further for instance adapted to be detachably attachable and/or attached to a vehicle (not shown).

Furthermore, FIG. 3c illustrates a schematic view of an exemplifying inflatable structure 10 according to embodiments of the disclosure, represented by an inflatable child seat 10'''. An outward-facing layer 112 of an outward-facing side section of the exemplifying child seat 10''' comprises, in an area of the side section where a curvature in an outward direction is desired, an exemplifying ridge 3 having a slightly curved shape 33 which may render the inflatable structure 10, here inflatable child seat 10''', to assume the desired shape and/or geometry. Said ridge 3 may, additionally or alternatively, provide the inflatable structure 10, here inflatable child seat 10''', with a reinforcement in an area in vicinity of the ridge 3, as rendered by the ridge 3. The exemplifying inflatable child seat 10'''—which optionally may comprise the inflatable structure 10—may for instance be represented by an inflatable vehicle child seat, further for instance adapted to be detachably attachable and/or attached to a vehicle (not shown).

Figure 4:
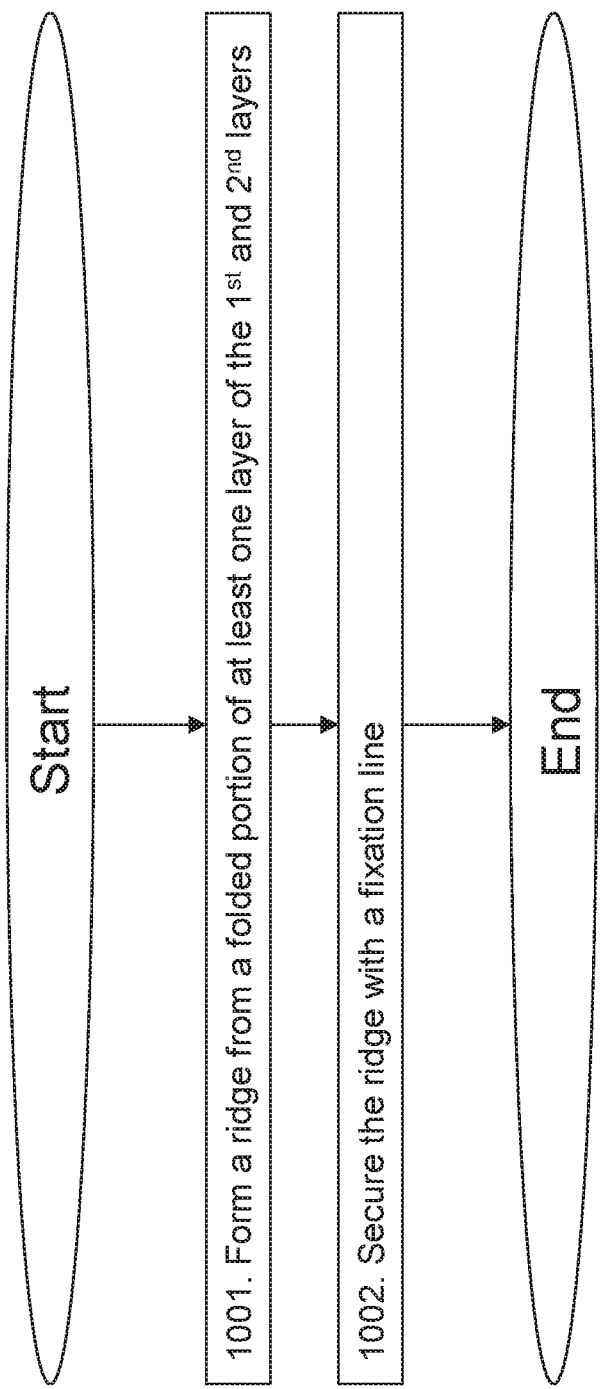
FIG. 4 is a flowchart depicting an exemplifying manufacturing method according to embodiments of the disclosure.

FIG. 4 is a flowchart depicting an exemplifying manufacturing method according to embodiments of the disclosure. The exemplifying method for manufacturing an inflatable structure 10, transformable between a deflated state and an inflated state, the inflatable structure comprising a first layer 11 and a second layer 12 tethered by drop stitches 2, comprises the following actions discussed with support from FIGS. 1-3.

Action 1001: In Action 1001, there is formed for at least one layer 112 of the one and second layers 11, 12, a ridge 3, by folding a portion of the one layer 112.

Action 1002: In Action 1002, the ridge 3 is secured with a fixation line 4.

Optionally, Action 1002 of securing the ridge 3 with a fixation line 4 may comprise securing the ridge 3 with a fixation line 4 comprising a seam 5, which seam 5 comprises stitches 51.

Further optionally, Action 1001 of forming a ridge 3 may comprise tailoring a positioning of the ridge 3 to enable the inflatable structure 10 to, in the inflated state, provide a predeterminable reinforcement and/or assume a predeterminable shape.

Further optionally, Action 1001 of forming a ridge 3 may comprise tailoring dimensions of the ridge 3 to enable the inflatable structure 10 to, in the inflated state, provide a predeterminable reinforcement and/or assume a predeterminable shape.

Further optionally, Action 1001 of forming a ridge 3 may comprise tailoring an extension 31 of the ridge 3 to enable the inflatable structure 10 to, in the inflated state, provide a predeterminable reinforcement and/or assume a predeterminable shape.

Further optionally, Action 1001 of forming a ridge 3 may comprise tailoring a width 32 of the ridge 3 in a direction perpendicular to a surface area 111 of the one layer 112 to enable the inflatable structure 10 to, in the inflated state, provide a predeterminable reinforcement and/or assume a predeterminable shape.

Further optionally, Action 1001 of forming a ridge 3 may comprise tailoring a shape 33 of the ridge 3 in a plane of a surface area 111 of the one layer 112 to enable the inflatable structure 10 to, in the inflated state, provide a predeterminable reinforcement and/or assume a predeterminable shape.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

Various examples have been described. These and other examples are within the scope of the following claims.

The invention claimed is:

1. An inflatable structure transformable between a deflated state and an inflated state, the inflatable structure comprising a drop stitch fabric having a first layer and a second layer tethered to each other by drop stitches to form an internal volume of the inflatable structure, wherein at least one layer of the first and second layers comprises a ridge formed by a folded portion of the one layer, folded to protrude externally of the internal volume and secured by a fixation line;
    wherein the fixation line comprises a seam comprising stitches; and
    wherein a positioning of the ridge is tailored to enable the inflatable structure to, in the inflated state provide, a predeterminable reinforcement and/or assume a predeterminable shape.

2. The inflatable structure according to claim 1, wherein dimensions of the ridge are tailored to enable the inflatable structure to, in the inflated state, provide a predeterminable reinforcement and/or assume a predeterminable shape.

3. The inflatable structure according to claim 2, wherein an extension of the ridge is tailored to enable the inflatable structure to, in the inflated state, provide a predeterminable reinforcement and/or assume a predeterminable shape.

4. The inflatable structure according to claim 2, wherein a width of the ridge in a direction perpendicular to a surface area of the at least one layer, is tailored to enable the inflatable structure to, in the inflated state, provide a predeterminable reinforcement and/or assume a predeterminable shape.

5. The inflatable structure according to claim 2, wherein a shape of the ridge in a plane of a surface area of the at least one layer, is tailored to enable the inflatable structure to, in the inflated state, provide a predeterminable reinforcement and/or assume a predeterminable shape.

6. An inflatable seat comprising the inflatable structure according to claim 1.

7. An inflatable vehicle seat comprising the inflatable structure according to claim 1.

8. The inflatable vehicle seat according to claim 7, wherein the inflatable vehicle seat is detachably attachable to a vehicle.

9. An inflatable vehicle child seat comprising the inflatable structure according to claim 1.

10. The inflatable vehicle child seat according to claim 9, wherein the inflatable vehicle child seat is detachably attachable to a vehicle.

11. An inflatable board comprising the inflatable structure according to claim 1.

* * * * *